July 26, 1932.  H. GLAENZER  1,869,248
LOCOMOTIVE FRAME
Filed April 13, 1931   6 Sheets-Sheet 4
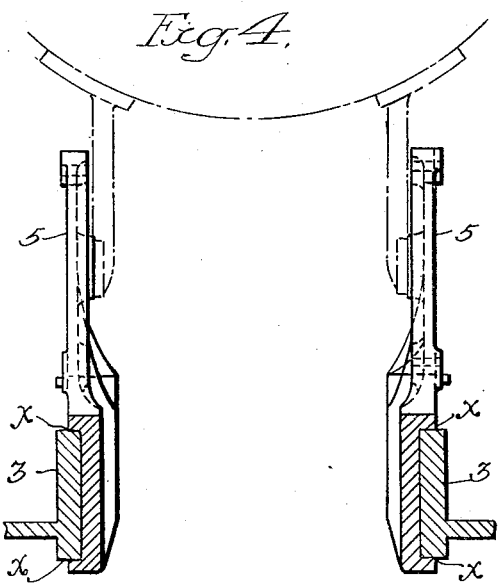
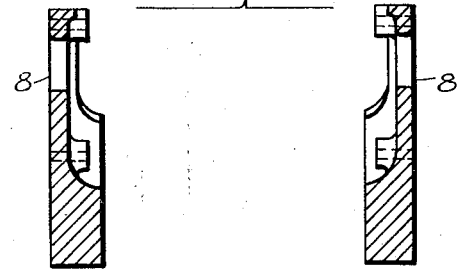
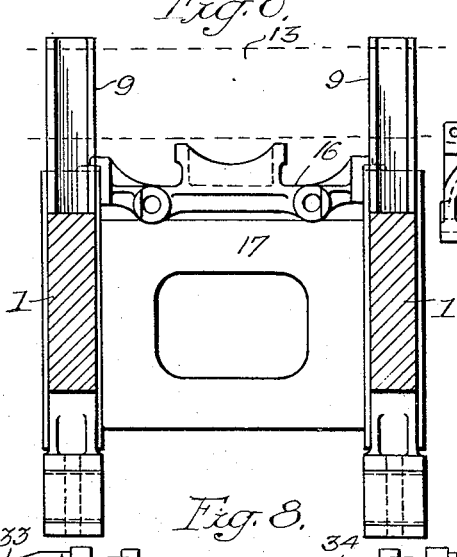
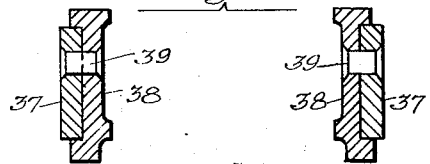
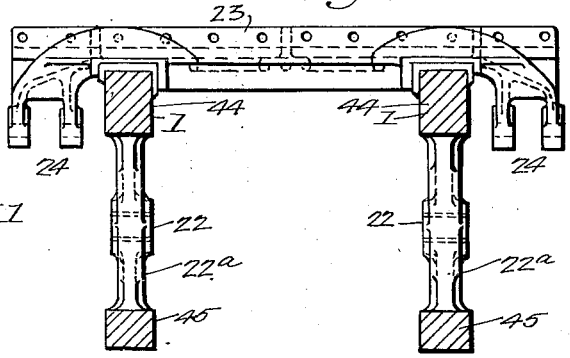
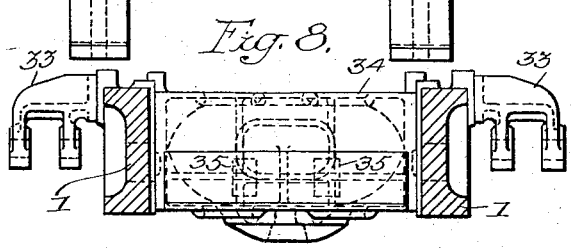
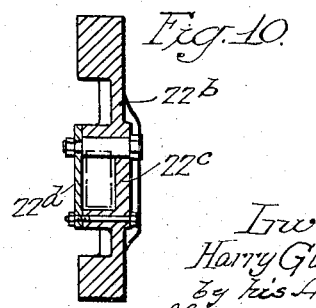
Inventor;
Harry Glaenzer
by his Attorneys
Harrison & Harrison

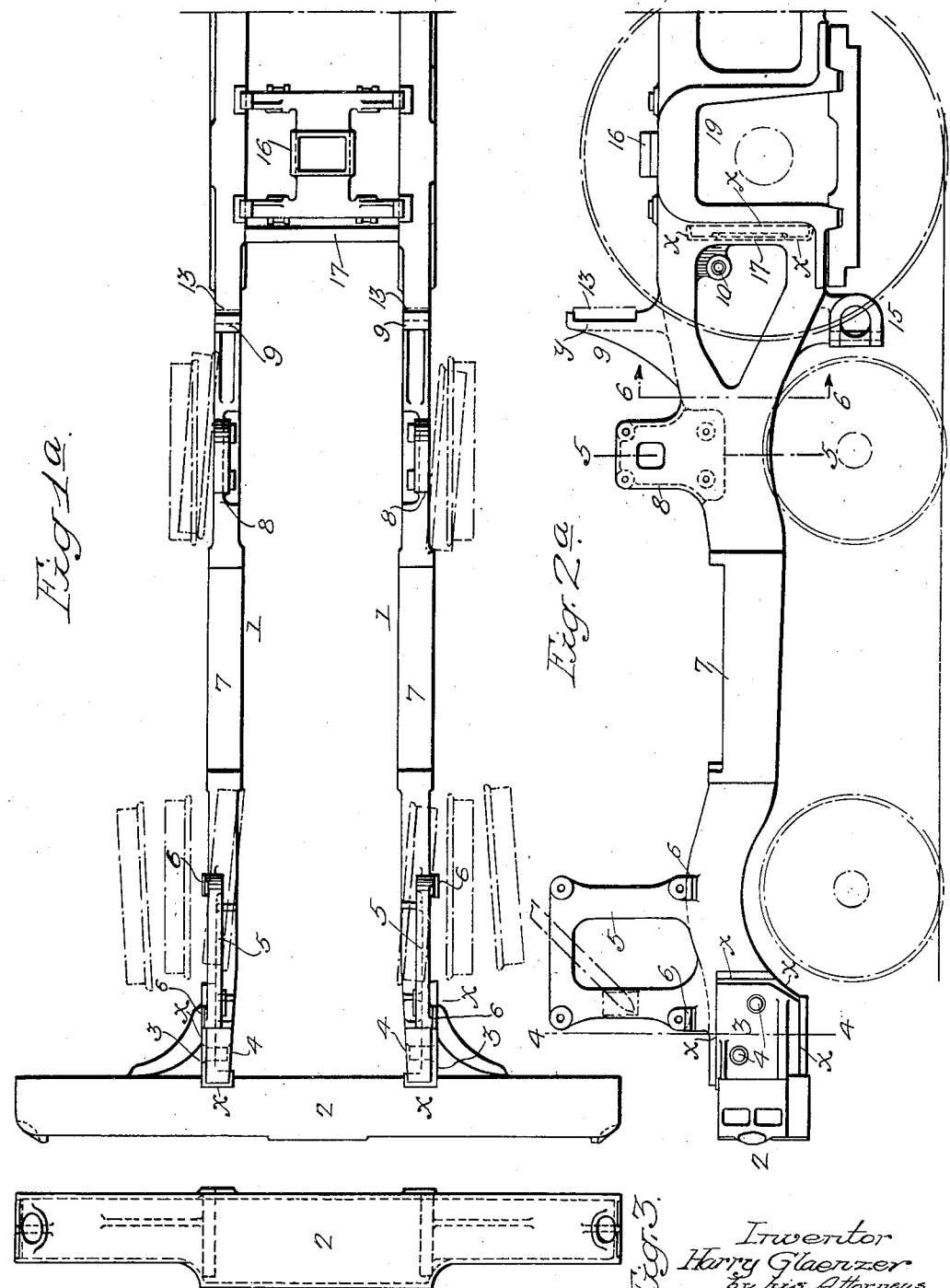

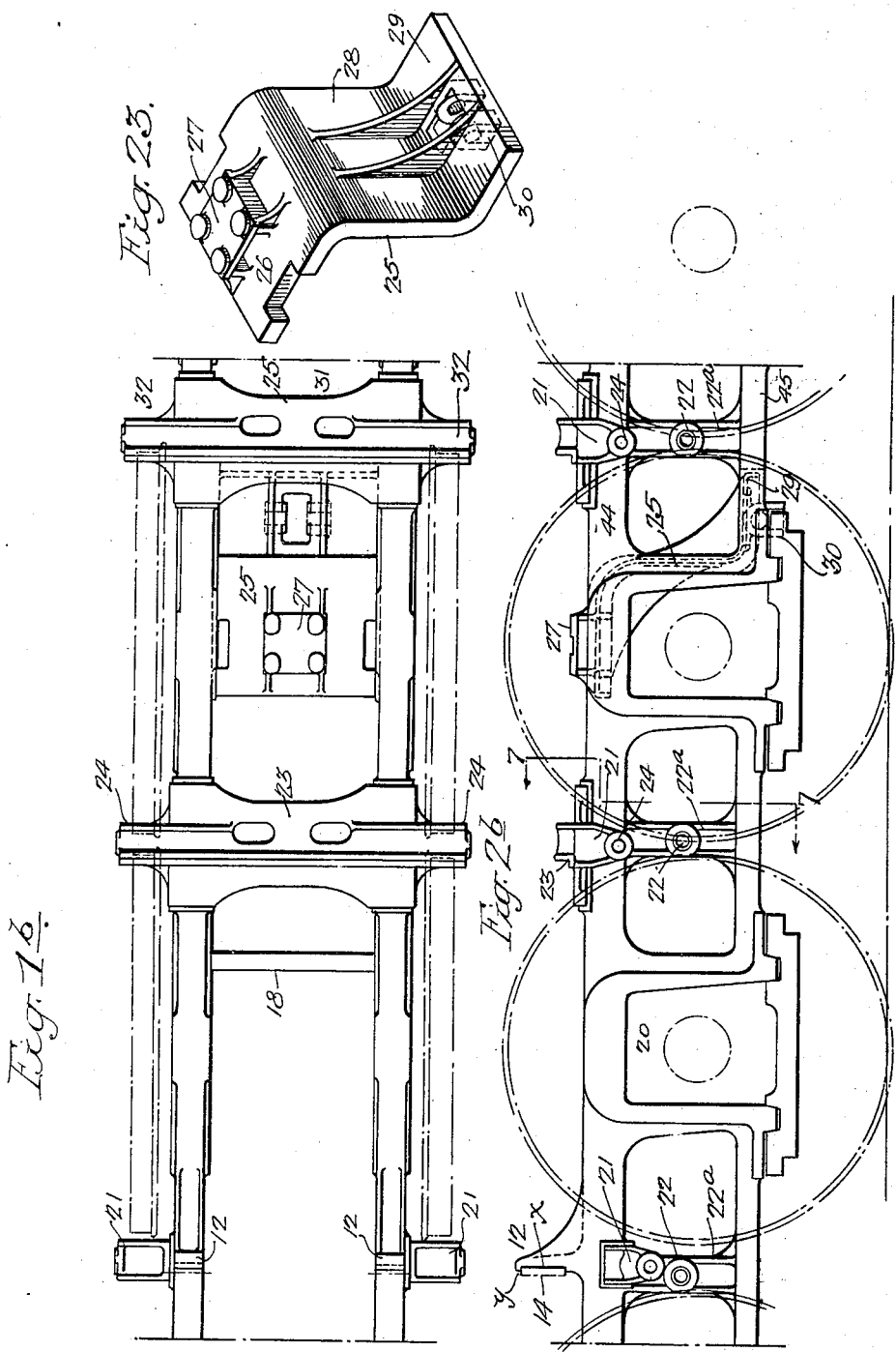

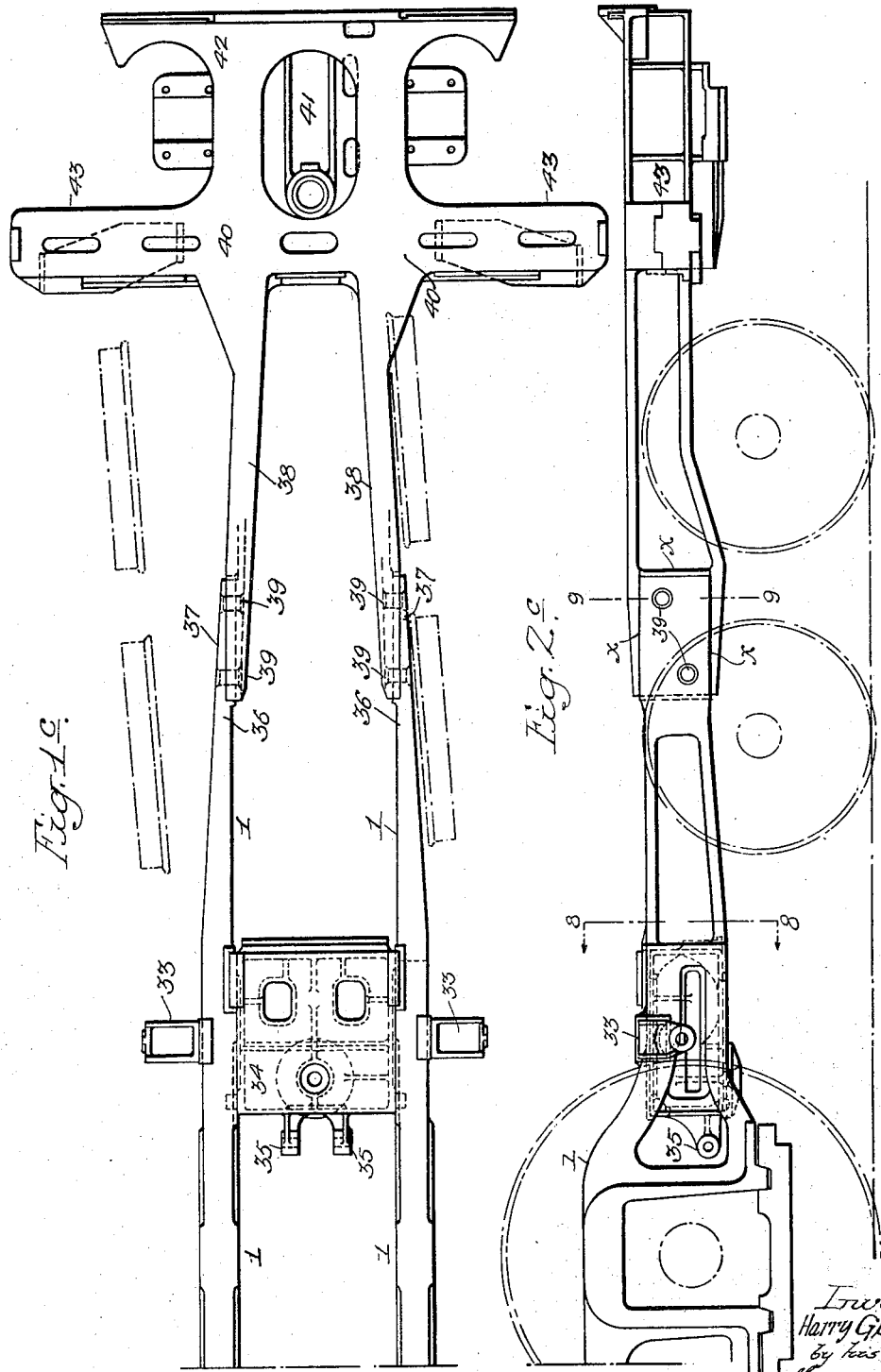

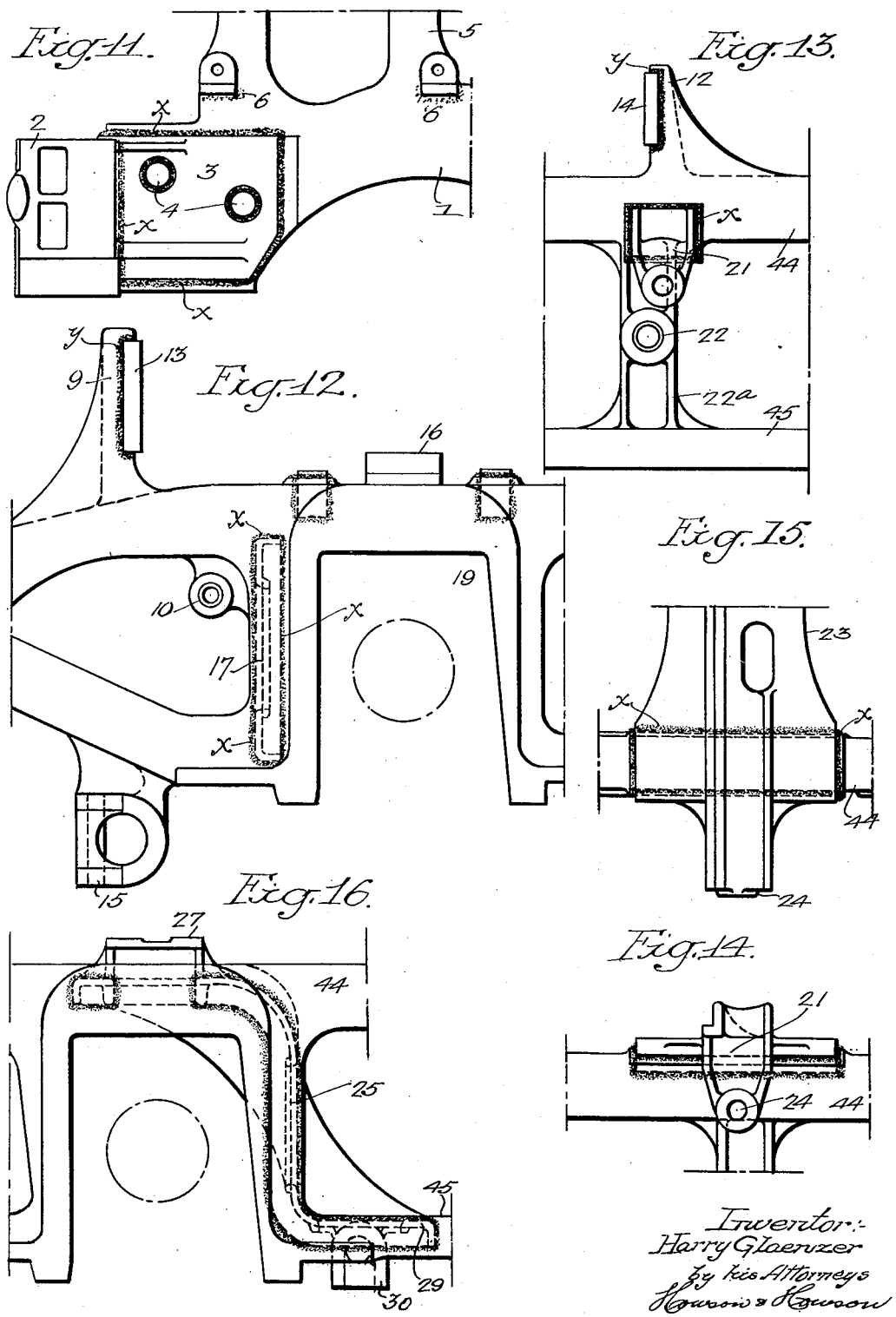

July 26, 1932. H. GLAENZER 1,869,248
LOCOMOTIVE FRAME
Filed April 13, 1931 6 Sheets-Sheet 6
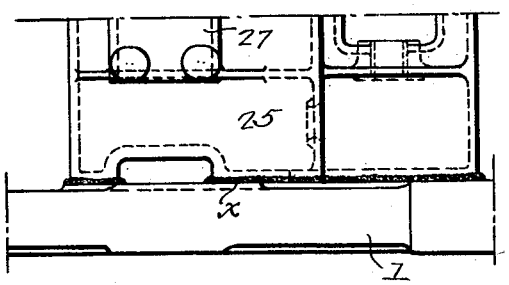
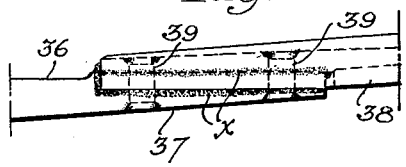
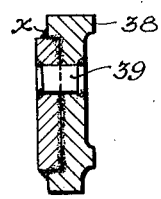
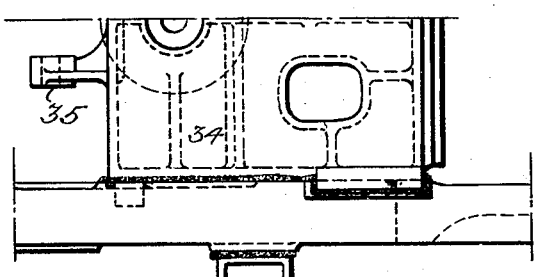
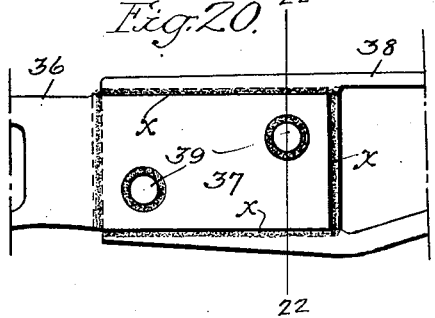
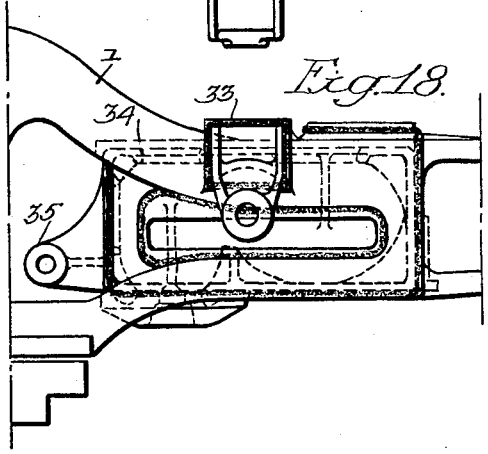
Inventor:
Harry Glaenzer,
by his Attorneys
Howson & Howson Patented July 26, 1932

1,869,248

UNITED STATES PATENT OFFICE

HARRY GLAENZER, OF PHILADELPHIA, PENNSYLVANIA

LOCOMOTIVE FRAME

Application filed April 13, 1931. Serial No. 529,838.

My invention relates to certain improvements in the frames of locomotives which are made in sections, the sections being welded together to form a unitary structure.

The object of the invention is to so construct a frame of this type that when the parts are welded together, they will form an integral structure. The front bumper of the structure has rearwardly extending angle flanges which are welded to pads on the longitudinal side frames, and the side frames have pads near the forward end for the vertical air pumps, and seats are provided for the cylinders. The structure also has vertical pads for the brake cylinders, and depending brake shaft brackets; and also has brackets for the guides of valve motion bearers; equalizing beam fulcrum bearings; driving spring link bearings; cross ties for different parts of the locomotive; waist bearer and brake hanger cross ties; and brake hanger brackets are provided, all welded to form a unitary structure.

In the accompanying drawings:

Figs. 1a, 1b and 1c are views illustrating my improved locomotive frame in plan;

Figs. 2a, 2b and 2c are side views illustrating my improved locomotive frame;

Fig. 3 is a view of the front end of the frame, illustrating the bumper;

Fig. 4 is a sectional view on the line 4—4, Fig. 2a;

Fig. 5 is a sectional view on the line 5—5, Fig. 2a;

Fig. 6 is a sectional view on the line 6—6, Fig. 2a;

Fig. 7 is a sectional view on the line 7—7, Fig. 2b;

Fig. 8 is a sectional view on the line 8—8, Fig. 2c;

Fig. 9 is a sectional view on line 9—9, Fig. 2c;

Fig. 10 is a modification of the equalizing beam fulcrum and frame strut;

Fig. 11 is an enlarged view of the front bumper, and a part of the vertical air pump support showing the welding indicated by a series of X's;

Fig. 12 is an enlarged view showing the welding of the guide bearer and bracket; a vertical cross tie; and the cross tie for the lateral motion device;

Fig. 13 is an enlarged view showing the welding of the valve motion bearer and brake hanger bracket;

Figs. 14 and 15 show the lines of the welding of the waist bearer and brake hanger cross tie to the side frames;

Figs. 16 and 17 are enlarged views showing the welding of the Z-shaped cross tie to the side frames;

Figs. 18 and 19 are views showing the welding of the trailer truck fulcrum cross tie to the side frames;

Figs. 20, 21 and 22 show the attaching plugs and the weld by which the rear frame is secured to the side frames; and Fig. 23 is a perspective view of the Z-shaped cross tie.

1—1 are the main side members of the frame of the locomotive. 2 is the bumper at the forward end of the frame. This bumper is made separate from the side members of the frame and has rearwardly extending angle flanges 3, which are secured to the ends of the side members 1 by plugs 4, which are fitted to the openings in both members and welded on the ends. In addition to these plugs the bumper is welded to the frame on the line $x$, Fig. 1a and Fig. 2a. 5 is a bracket forming an integral part of the frame and having pads for the vertical air pump. The lugs 6 are made separate from the lower pads and welded thereto. 7 are the seats for the cylinder structure, which is mounted on the frame and secured thereto in any suitable manned. 8—8 are projections on which are the pads for the brake cylinder. 9 is an integral bracket for the guide bearer. 10 is an integral bracket for the spring link bearing. 12 is the integral valve motion bracket. The guide bracket 9 and the valve motion bracket 12 are recessed and have bearers 13 and 14, respectively, which are welded at Y—Y to their brackets. 15 is a brake shaft bracket. 16 is a cross tie for the lateral motion device, and 17 and 18 are braces extending from one side member 1 to the other, as shown in Figs. 1a and 6. These braces are located at the pedestals 19 and 20, respectively, and form the pedestal cross ties.

21 is the brake hanger bracket and 22—22 are the equalizing beam fulcrums. 23 is the waist bearer and brake hanger cross tie. This waist bearer extends from one side member to the other, as shown in Fig. 1b and Fig. 7. Each outer end has depending bearings 24 for the brake hangers 25 is a cross tie, which is set in between the two frames and welded thereto. This cross tie is Z-shaped, as shown in Fig. 23, having a platform 26 at the upper end, on which is the pad 27 for a brake cylinder and a vertical portion 28 of the cross tie forms a pedestal cross tie and has a horizontal portion 29 in the lower end, having bearings 30 for a brake shaft.

31 is a second waist bearer cross tie, similar to the cross tie 23, and has bearings 32 at each end, which overhang the side frames and form brake hanger brackets. 33 are brackets which are welded to the side frames for the brake hangers, and 34 is a cross tie located between the two side members and welded thereto, and in this cross tie is an opening for the fulcrum pin of the trailer truck.

Bearing brackets 35 project from this cross tie between the frames. The ends 36 of the side members are reduced in width and are beveled as shown at 37, and fitting against these beveled portions of the side members are the extensions 38 of the rear frame 40. These extensions are secured to the ends of the side members by the plugs 39, and the ends of these plugs are welded as shown and the extensions 38 are also welded to the side frames on the lines x—x. The rear frame has a draw bar recess 41 and a bumper extension 42 and side extensions 43.

In Fig. 2b and in Fig. 7 the equalizing beam fulcrum 22 is formed on a vertical strut 22a, which extends from the upper rail 44 of the side members to the lower rail 45 of the side members. This fulcrum is designed to provide a bearing for a pair of equalizing beams arranged side-by-side.

Where the equalizing mechanism provides for a single beam instead of a pair of beams, the equalizing beam fulcrum is made as shown in Fig. 10. The vertical strut 22b is recessed at 22c for a single beam, shown by dotted lines, and is provided with an inclosing cap plate 22d.

The enlarged views illustrate the welding lines between the several parts of the structure and the side members of the main frame, and while these welding lines are clearly shown on these views without further explanation, it will be understood that the particular welding lines may be modified without departing from the essential features of the invention.

I claim:—

1. The combination in a locomotive frame, of two side members; a rear frame welded to the said side members; a bumper with rearwardly extending angle flanges; and plugs extending through the flanges and through the ends of the frame, the said plugs being welded on the ends, and the flanges being also welded to the frames.

2. The combination in a locomotive frame, of two side members; a rear frame welded to the said side members; a bumper with rearwardly extending angle flanges; plugs extending through the flanges and through the ends of the frame, the said plugs being welded on the ends, and the flanges being also welded to the frames; and a vertical air pump support made integral with each side frame, and having pads to which an air pump is secured.

3. The combination in a locomotive frame, of two side members; a rear frame welded to the said side members; a bumper having rearwardly extending angle flanges; plugs extending through the flanges and through the ends of the frame, the said plugs being welded on the ends, and the flanges being also welded to the frames; a vertical air pump support made integral with each side frame and having pads to which an air pump is secured; and a vertically projecting portion integral to the member and having pads for the brake cylinder.

4. The combination in a locomotive frame, of two side members; a rear frame welded to the said side members; a bumper having rearwardly extending angle flanges; plugs extending through the flanges and through the ends of the frame, the said plugs being welded on the ends, and the flanges being also welded to the frames; a vertical air pump support made integral with each side frame and having pads to which an air pump is secured; and a vertically projecting portion integral with a side member and having pads for the brake cylinder, said side members having seats intermediate of the air pump support and a brake cylinder support for the cylinder structure.

5. The combination in a locomotive frame, of side members; a pump secured to the forward end of the side members; a rear frame secured to the rear end of the side members; and a Z-shaped cross tie, the upper portion of the cross tie having pads for a brake cylinder; and the lower portion of the Z-frame having bearings for the brake shaft.

6. The combination in a locomotive frame, of side members having pedestals for the axle boxes and a bumper secured to the forward ends of the side members; a rear frame secured to the rear end of the side members; and a trailer truck fulcrum cross tie extending from one frame to the other between the last pedestal and the rear frame, and having a fulcrum for the trailer truck, the said cross tie being welded to the side members.

7. The combination in a locomotive engine frame, of side members having pedestals; a bumper secured to the forward end of the side members; a rear frame, said rear frame having extensions; and plugs coupling the extensions to the rear ends of the side members, the ends of the plugs being welded, the extensions of the rear frame being independently welded to the side frames.

8. The combination in a welded locomotive frame, of side members; a front bumper having rearwardly extending angle frames welded to the ends of the side members; a rear frame having extensions welded to the rear ends of the side members; a vertical frame at the forward end of the structure having pads for an air pump and projections having pads for brake cylinders; seats for the cylinders of the locomotive located between the pads for the air pumps and brake cylinders; depending shaft brackets; upstanding brackets for guide and valve motion bearers; equalizing beam fulcrums in each side member; driving spring link bearings; cross ties spaced between the side members for a lateral motion device; a Z-shaped brake cylinder and bearing cross tie extending from one side member to the other; a trailer truck fulcrum cross tie; pedestal cross ties and waist bearer and brake hanger cross ties; and brake hanger brackets, the parts being welded together to form a unitary structure.

9. The combination in a locomotive frame, of a side member having upper and lower rails; a vertical strut connecting the rails, said strut having a recess therein for an equalizing beam; a cap enclosing the recess; and means for securing the cap to the strut.

HARRY GLAENZER.